3,020,465
DYNAMOELECTRIC MACHINE AND
GOVERNOR
Robert L. Rowe, Sag Harbor, N.Y.
Filed Mar. 15, 1960, Ser. No. 15,223
10 Claims. (Cl. 318—325)

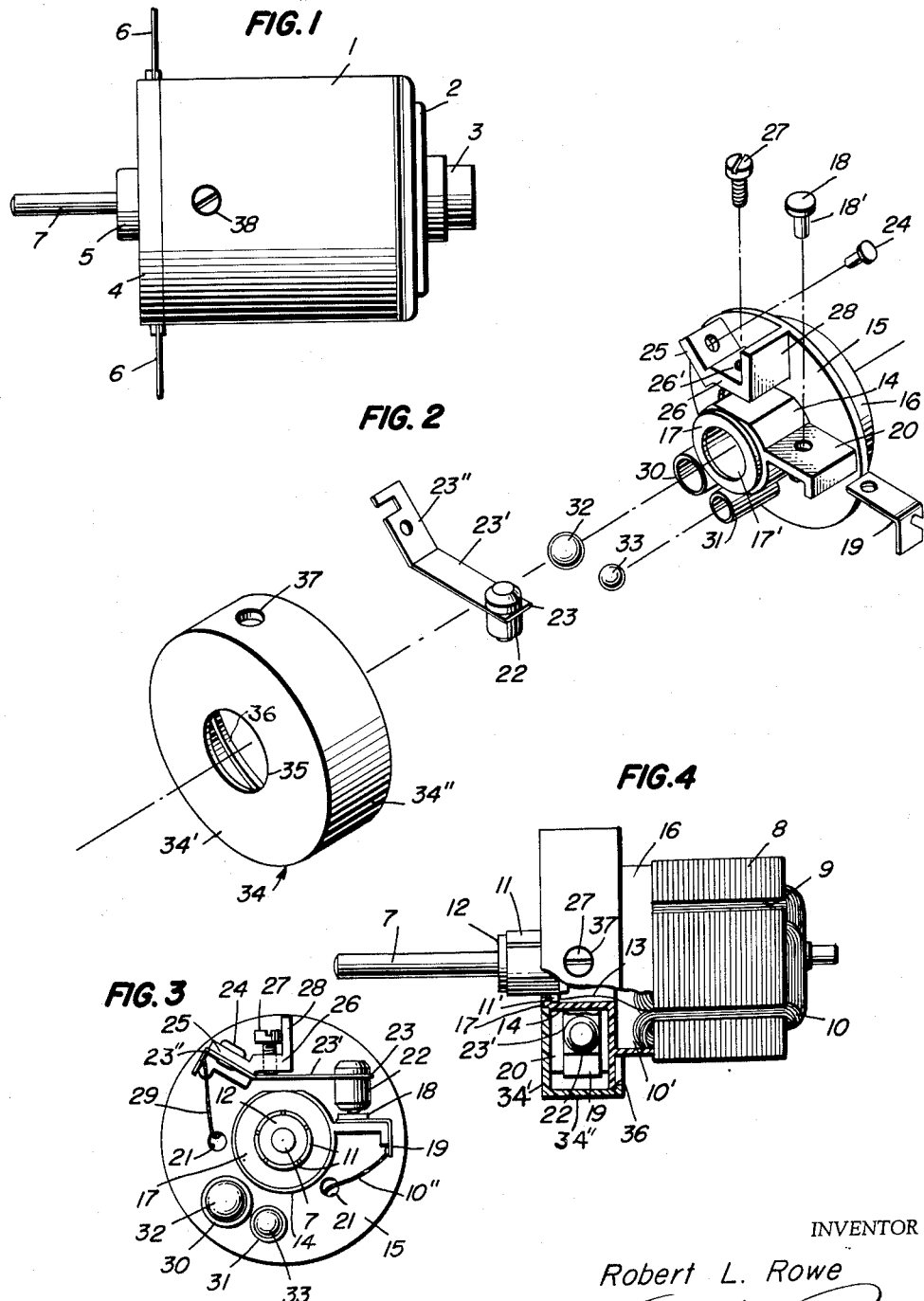
Feb. 6, 1962 — R. L. ROWE — 3,020,465
DYNAMOELECTRIC MACHINE AND GOVERNOR
Filed March 15, 1960
INVENTOR
Robert L. Rowe
ATTORNEY United States Patent Office 3,020,465
Patented Feb. 6, 1962

This invention relates to dynamoelectric machines and centrifugal governors for regulating the speed of such machines. It pertains particularly to a dynamoelectric machine having an improved rotatable member with a simplified device for providing a more rugged rotatable member having the end turns and the connections of the rotatable member windings to a current collector substantially totally enclosed by a centrifugal governor. This is made especially practical by mounting the centrifugal speed governor on the rotatable member between its current collector and windings.

In very small size dynamoelectric machines it is quite important to provide adequate protection for the connections of the rotatable member windings to its current collector, as these connections and the end turns of the winding are made of very fine conductors which can be easily broken or otherwise damaged, as by short circuiting. In addition, when such dynamoelectric machines are provided with speed governors, it is necessary that such governors be constructed of very small parts and that they be as light weight as possible. It, therefore, also becomes important to provide a relatively good enclosure for the speed governor in order to minimize the interference of foreign matter with the proper operation of the relatively movable parts of the governor. Furthermore, it is desirable that the speed governor be constructed so that the speed at which it is operative for maintaining constant the speed of the rotatable member may readily be adjusted from the exterior of the dynamoelectric machine. In addition, the speed governor should be constructed so that it will maintain the speed of the rotatable member substantially constant irrespective of the operating temperature of the machine.

In accordance with the present invention, it has been found that these desirable properties of the rotatable member can be attained by providing a simplified enclosing structure over the end turns of the rotatable member winding and its connections to the current collector and concurrently performing the function of a support for the speed governor of the machine. Furthermore, by mounting the movable contact of a speed governor on an improved reed mounting element, with a simple adjustment for varying the pressure of the movable contact upon the relatively fixed contact of the speed governor, the speed of operation thereof can be maintained substantially constant through the operating temperature range of the machine. In addition, the balance of the rotatable member can be very effectively obtained, including the balance of the centrifugal speed governor, by a simplified arrangement for securing and varying balancing weights on the rotatable member within the speed governor enclosure.

An object of this invention is to provide an improved and simplified dynamoelectric machine construction.

Another object of this invention is to provide an improved and simplified dynamoelectric machine with a rotatable member or more rugged construction and a speed governor adapted to maintain the speed of the machine substantially constant.

A further object of this invention is to provide an improved dynamoelectric machine rotatable member with a speed governor for regulating the normal operating speed of the machine.

Still another object of this invention is to provide an improved speed responsive governor for a dynamoelectric machine of relatively light weight and simple rugged construction.

Further objects and advantages of this invention will become apparent from the following description referring to the accompanying drawings, and the features of novelty which characterize this invention will be pointed out with particularity in the claims appended to and forming a part of this specification.

In the drawings:

FIG. 1 is a plan view of a dynamoelectric machine incorporating an embodiment of the present invention;

FIG. 2 is an exploded perspective view of an improved speed responsive governor made in accordance with this invention;

FIG. 3 is an end view of the rotatable member of a dynamoelectric machine of the type shown in FIG. 1, provided with a speed governor, such as that shown in FIG. 2, with the outer enclosure of the governor housing removed; and FIG. 4 is a side elevational view of the rotatable member of the dynamoelectric machine shown in FIGS. 1 and 3, with parts of the speed governor broken away to illustrate the assembled relationship of the mounting and enclosure members of the centrifugal governor to the rotatable member winding and current collector.

Referring to the drawing, a dynamoelectric machine is shown comprising a stationary member having an enclosing housing 1 with a permanently attached end shield 2 and bearing housing 3, and a removable end shield 4 having a bearing housing 5 therein. This removable end shield is adapted to support a current collector brush rigging having terminals 6 extending outwardly through and insulated from the end shield 4. The dynamoelectric machine also is provided with a rotatable member having a shaft 7 which is adapted to support the rotatable member in the bearings mounted in the stationary member bearing housings 3 and 5. The rotatable member is provided with a laminated core 8 of magnetic material, which is suitably secured to the shaft 7 and is formed with conventional winding slots 9 in which a winding 10 is arranged. Energization of the rotatable member winding 10 is adapted to be provided by connection to a source of electrical power through the terminals 6 and a suitable brush rigging. The brush rigging is adapted to make electrical contact with a current collector in the form of a commutator comprising commutator bars 11 suitably mounted on an insulating sleeve 12 secured to the shaft 7 in axially spaced relation to the core 8.

The rotatable member windings 10 are connected to the commutator bars 11 by suitable conductors 13, which extend from the coils of the windings 10 to riser elements 11' on the inner sides of the commutator bars 11. A suitable brush rigging for transmitting electrical power from an external electrical source to the current collector of the machine is illustrated and described in applicant's co-pending application Serial No. 15,222, filed March 15, 1960.

A dynamoelectric machine of the type illustrated may be provided with permanent magnet excitation in the stationary member of the machine and the winding of the rotatable member may be suitably energized by direct current. With such a construction it is desirable that provision be made for limiting the speed of the rotatable member and for governing this speed to maintain it substantially constant at some predetermined value.

In accordance with this invention, the speed of the rotatable member can be governed by making and breaking the electrical circuit through the winding of the rotatable member, so that this winding is energized for all values of the speed of the rotatable member below the predetermined constant value, and is deenergized by breaking the rotatable member circuit through its winding above the predetermined desirable operating speed.

A very sensitive control of the speed of the rotatable member is obtainable by providing it with a speed responsive governor in the form of a centrifugal switch of the type shown in FIGS. 2, 3, and 4.

The improved speed responsive governor includes a main mounting member formed of insulating material and comprising a cylindrical collar 14 with a relatively large diameter flange 15 extending outwardly from the collar 14 at one end thereof, on which the main supporting elements of the speed governor are mounted. A second cylindrical collar 16 is formed on the mounting member integral with the flange 15 and extending in a direction away from the collar 14 for enclosing end turns of the rotatable member windings. As is more clearly seen in FIG. 4, the inner diameter of the collar 14 is substantially equal to the outer diameter of the risers 11' of the current collector commutator bars for fitting snugly over these risers. An inwardly extending flange 17 is formed on the end of the collar 14 away from flange 15, and has a central opening 17' therein substantially equal to the outer diameter of the commutator bars 11. This central opening in the flange 17 provides for assembly thereof around the commutator with a snug sliding fit. In the final assembled structure the collar 14 is fitted over the commutator bars with the risers 11' providing a snug fit within the collar, so that when the insulating mounting is pressed fully into position on the rotatable member, the small flange 17 abuts against the outer edges of the commutator bar risers 11', and the larger collar 16 fits snugly over end turns 10' of the rotatable member windings and the connections 13 to the commutator risers 11'. This enclosure is formed by the collars 14 and 16 and the flanges 15 and 17 of the main mounting member of the speed governor, and provides added support and protection to these elements.

The improved speed responsive governor is provided with a fixed electrical contact 18, which is formed by the head of a rivet 18' secured over a terminal member 19. The rivet secures the terminal member on a supporting bracket formed as a lug 20 extending substantially radially outwardly from the collar 14 and formed integrally with the collar 14 and the flange 15. This provides a relatively rigid fixed insulating support for the fixed contact 18.

One terminal of the circuit through governor and the rotatable member windings 10 is connected to a lead 10", which extends from the windings 10 through a relatively small aperture 21 in the flange 15 for connection to the governor. This lead is conveniently connected to the fixed contact 18 through the terminal 19 and the electrical circuit is adapted to be made and broken through the fixed contact 18 and a relatively movable electrical contact 22. This contact 22 preferably has a substantial mass so that it will be acted upon by centrifugal force in such a way as to be moved outwardly away from and out of contact with the fixed electrical contact 18 above an adjustably predetermined speed. In order to provide this desirable movement of the movable contact 22, it is conveniently mounted on a relatively flat, long, leaf-spring reed mounting member 23. This reed mounting member is secured to the main insulating mounting member of the speed governor and has a resiliency which will provide for maintaining electrical contact between the contacts 22 and 18, below a predetermined speed, and to allow these contacts to separate and break the electrical circuit therebetween, above a predetermined speed of rotation of the rotatable member of the machine.

In order to assure a definite speed of operation of the governor, it is desirable to provide the reed mounting member 23 with a fixed operating lever arm and a definite fulcrum for its movement. These are obtained by forming a transverse knee-bend in the reed member which divides the length thereof into two angularly extending leg sections 23' and 23" and mounting it to provide the desired fixed relationships. The movable electrical contact 22 is mounted on the end of the leg section 23', and the leg section 23" is fixedly secured in any suitable manner, as by a rivet 24, to an angularly extending side 25 of an insulating lug formed integrally with the main mounting member and extending outwardly from the large flange 15. This angularly extending side 25 is an integral part of a lug, which is formed with a second side 26 extending angularly to the side 25 and is also integrally formed with the large flange 15. The fixed fulcrum is obtained by providing a threaded aperture 26' in the angularly extending side 26 of the lug and is adapted threadedly to receive a pressure adjusting fulcrum screw 27. This screw 27 is adapted to be screwed inwardly into engagement with the reed mounting member leg 23', so as to bias this leg and the movable electrical contact 22 toward the fixed electrical contact 18 for exerting contact pressure thereon. As is best seen in FIG. 3, the knee bend in the reed mounting member 23 and the mounting of the reed member leg 23" on the angularly extending side 25 of the mounting lug, provides for pivotal action of the reed mounting leg 23' about its engagement with the end of the adjusting screw 27, and prevents pivoting of the reed about the mounting rivet 24. This assures a constant leverage for the pivoting of the movable electrical contact 22. The construction of the mounting for the adjusting screw 27 as an integral part of the lug, having the two angularly extending sides 25 and 26, to which the reed 23 is secured, provides assurance against the possibility of cold flow between the point at which the reed mounting member is secured and the mounting for the adjusting screw, thus assuring against a variation in the speed setting, which might be brought about if these two points were not integrally connected together. In order further to assure against distortion of the mounting of the movable electrical contact support, a third side 28 is formed on the lug at an angle to the sides 25 and 26, and is also integrally connected to the large flange 15 of the insulating mounting member.

The speed controlling circuit of the dynamoelectric machine is operable through the governor contacts 18 and 22, which are connected in the circuit of the rotatable member windings 10 by leads 10" and 29. The illustrated rotatable member is of the five pole type, and the leads 10" and 29 can be connected between a common connection of the coils for the five poles, which would place the coils for three poles on one side of the contacts and the coils for two poles on the other side. For example, the terminals of the coils opposite those connected to the commutator for three poles can be connected by lead 10" to fixed contact 18, and the corresponding terminals of the coils for the remaining two poles connected by lead 29 to movable contact 22 through the electrically conductive reed mounting member 23. Thus, opening and closing of the governor contacts opens and closes the rotatable member circuit to cause it to decelerate or accelerate, respectively, and to maintain substantially constant the speed of the machine.

In order to obtain a balanced construction of the rotatable member of the machine, it is desirable to provide an arrangement for attaching suitable balancing weights to the rotatable member, particularly to balance the speed governor parts which are mostly mounted on one side of the shaft 7, as can be more readily seen in the end view of FIG. 3. Such a balancing of the complete structure can conveniently be made by a simplified construction which comprises a pair of axially extending cups 30 and 31, formed integrally with the main insulating mounting member, on one side thereof, generally opposite the contacts 18 and 22. The cup 30 preferably is made larger than the cup 31, so that balancing weights of different sizes can be added, if necessary. As shown in FIGS. 2 and 3, the balancing weights may conveniently be in the form of balls 32 and 33, of a size to fit in tight retaining engagement within the respective cups 30 and 31. Furthermore, in order to obtain a more complete balance of the rotatable member, the balls 32 and 33 may be made of materials having different specific gravities, such that by varying the specific gravity of a ball, the size thereof, and its location in cup 30 or 31, a substantially balanced speed governor and rotatable member can be obtained. In some instances, it may be desirable to make the larger ball 32 of a material with a higher specific gravity than the smaller ball 33, and in other instances the reverse may be the case. Furthermore, in some instances only one or another of the two balls may be necessary, and either may be of a heavier or a lighter material. Such an evenly balanced speed governor minimizes the possibility of vibrations which could result from an unbalanced structure and assures operation of the speed governor solely in response to centrifugal forces acting thereon in direct proportion to the speed of the rotatable member.

In small dynamoelectric machines of the type to which this invention is particularly directed, the relatively small size of the various parts of the speed governor make it especially important that foreign matter should be excluded from the operating parts thereof. In order to assure a substantially dustproof enclosure of the governor parts, an outer lightweight insulating casing 34 is provided, with a substantially radially extending end plate 34' having a central aperture 35 adapted to fit tightly over the outer edge of the small flange 17 of the main governor mounting member. The casing 34 also is provided with an axially extending cylindrical side portion 34" which is formed with an inner diameter substantially equal to the outer diameter of the large mounting member flange 15, and is adapted to fit over this flange, such that a small inwardly extending collar 36, on the end of the cylindrical side portion 34" away from the flange 34', is adapted to snap over the mounting member flange 15 and to secure the casing 34 in assembled position on the mounting member. This provides a substantially totally enclosed housing around the operating parts of the speed governor with only two relatively small apertures 21 through which the leads 20 and 29 from the rotatable member winding pass and connect to the terminals of the governor contacts 18 and 22.

In order to provide for adjustment of the speed of operation to be maintained by the governor, provision is made for adjusting the position of the regulating screw 27 by providing a small opening 37 in the cylindrical side portion 34" of the casing. This opening 37 is aligned with the head of the screw 27 and is of a size to provide only a very small clearance around the edges of the top of the screw for the admission of a suitable screwdriver through the opening 37. Furthermore, the angularly extending sides 25, 26, and 29 of the lug which supports the movable contact 22, extend axially substantially into engagement with the inner side of the casing flange 34' and the two sides 25 and 29 extend radially substantially to the outer periphery of the flange 15 and into engagement with the inner surface of the cylindrical side portion 34", thus forming a substantially enclosed chamber around the head of the screw 27 and further minimizing the possibility of entrance of foreign matter into the casing around the operating parts of the speed governor.

The stationary member 1 of the dynamoelectric machine also is formed with a small opening 38, substantially the same size as the opening 37, and adapted to register with the opening 37 to provide for the insertion of a screwdriver therethrough for adjustment of the screw 27.

In order to minimize the weight of the speed governor, the two main insulating parts thereof, comprising the mounting members for the governor and the casing 34, are preferably formed of a molded plastic, such as nylon. This not only insulates the electrical components of the governor, but also provides added protection in case an excessive voltage is applied to the motor which might cause the rotatable member to attain an excessively high speed, such that the governor reed 23 and the movable contact 22 might tend to fly out against the stationary member and destroy the governor. The enclosing casing 34 would act as a stop under such adverse operating conditions and prevent destruction of the mechanism, as well as preventing grounding of the electrical circuit by the engagement of the movable contact 22 with the stationary member. Thus, it is seen that the present simplified construction provides for ease in adjusting the speed governor to maintain the desired operating speed of the rotatable member of the machine, assures against the interference of foreign material with the operating parts, and, particularly, with the contacts of the speed governor, provides a balanced governor and rotatable member for the machine, assures against undesirable cold flow between the support of the adjusting screw and the point to which the mounting reed 23 is secured, and also provides against pivoting of the mounting reed 23 around its point of support rather than its pivotal engagement with the adjusting screw. All of these important features contribute to the positive actuation of the speed governor for maintaining the speed of a rotatable member at a predetermined adjustable value, and provide for a rugged construction adapted to assure a long life to all of the operating parts of the rotatable member and its speed governor.

While I have illustrated and described a particular embodiment of this invention, modifications thereof will occur to those skilled in the art. It is to be understood, therefore, that this invention is not to be limited to the particular arrangement and structure disclosed, and it is intended in the appended claims to cover all modifications within the spirit and scope of this invention.

I claim:

1. A dynamoelectric machine comprising a stationary member and a rotatable member having a shaft, said rotatable member having a winding and a current collector connected thereto, means responsive to the speed of said rotatable member for opening and closing the circuit of said rotatable member winding, said speed responsive means comprising an insulating mounting member supported on said rotatable member and arranged around end turns of said rotatable member winding adjacent to said current collector, a fixed electrical contact connected in said rotatable member winding circuit and fixedly mounted on said mounting member, a centrifugally speed responsive movable electrical contact connected in said rotatable member winding circuit and adapted to contact said fixed contact for closing the rotatable member winding circuit therethrough, a reed mounting member for supporting said movable electrical contact, a lug with two angularly extending sides formed on said insulating mounting member, means securing said reed mounting member to said insulating mounting member lug and arranged to support said movable eelctrical contact adjacent to said fixed contact, and means comprising an adjusting screw threadedly engaging said insulating mounting member lug and arranged for adjustment therein relative to said reed mounting member for engagement therewith for biasing said movable contact toward said fixed contact to vary the contact pressure therebetween whereby said movable contact will break contact with said fixed contact under the action of centrifugal force thereon according to the adjusted position of said biasing screw for regulating the speed of said rotatable member by open circuiting the winding thereof above a predetermined speed dependent on the position of said biasing screw.

2. A dynamoelectric machine comprising a stationary member and a rotatable member having a shaft, said rotatable member having a winding and a current collector connected thereto, means responsive to the speed of said rotatable member for opening and closing the circuit of said rotatable member winding, said speed responsive means comprising an insulating mounting member supported on said rotatable member and arranged around end turns of said rotatable member winding between said current collector and said rotatable member core, a fixed electrical contact connected in said rotatable member winding circuit and fixedly mounted on said mounting member, a centrifugally speed responsive movable electrical contact connected in said rotatable member winding circuit and adapted to contact said fixed contact for closing the rotatable member winding circuit therethrough, balancing means including a pair of axially extending cups formed integrally with said mounting member on the side of said shaft generally opposite said contacts, one of said cups being larger than the other, and balancing ball means in said cups of such size as to fit in tight retaining engagement within said cups, said ball means having such specific gravity relative to the size thereof as to provide a substantially balanced rotatable member structure.

3. A dynamoelectric machine comprising a stationary member and a rotatable member having a shaft, said rotatable member having a winding and a current collector connected thereto, means responsive to the speed of said rotatable member for opening and closing the circuit of said rotatable member winding, said speed responsive means comprising an insulating mounting member supported on said rotatable member and arranged around end turns of said rotatable member winding between said current collector and said rotatable member core, a fixed electrical contact connected in said rotatable member winding circuit and fixedly mounted on said mounting member, a centrifugally speed responsive movable electrical contact connected in said rotatable member winding circuit and adapted to contact said fixed contact for closing the rotatable member winding circuit therethrough, a reed mounting member for supporting said movable electrical contact, a lug on said insulating mounting member, means securing said reed mounting member to said insulating mounting member lug and arranged to support said movable electrical contact adjacent to said fixed contact, means comprising an adjusting screw threadedly engaging said insulating mounting member lug and arranged for adjustment therein relative to said reed mounting member for engagement therewith for biasing said movable contact toward said fixed contact to vary the contact pressure therebetween whereby said movable contact will break contact with said fixed contact under the action of centrifugal force thereon according to the adjusted position of said biasing screw for regulating the speed of said rotatable member by open circuiting the winding thereof above a predetermined speed, said insulating mounting member forming an enclosure for said speed responsive means, balancing means including a pair of axially extending cups formed integrally with said mounting member on the side of said shaft generally opposite said contacts, one of said cups being larger than the other, and balancing ball means in said cups of such size as to fit in tight retaining engagement within said cups, said ball means having such specific gravity relative to the size thereof as to provide a substantially balanced rotatable member structure.

4. A dynamoelectric machine comprising a stationary member and a rotatable member having a shaft, said rotatable member having a winding and a current collector connected thereto, means responsive to the speed of said rotatable member for opening and closing the circuit of said rotatable member winding, said speed responsive means comprising an insulating mounting member supported on said rotatable member and arranged around end turns of said rotatable member winding adjacent to said current collector, a fixed electrical contact connected in said rotatable member winding circuit and fixedly mounted on said mounting member, a centrifugally speed responsive movable electrical contact connected in said rotatable member winding circuit and adapted to contact said fixed contact for closing the rotatable member winding circuit therethrough, a reed mounting member for supporting said movable electrical contact, a lug on said insulating mounting member, means securing said reed mounting member to said insulating mounting member lug and arranged to support said movable electrical contact adjacent to said fixed contact, means comprising an adjusting screw threadedly engaging said insulating mounting member lug and arranged for adjustment therein relative to said reed mounting member for engagement therewith for biasing said movable contact toward said fixed contact to vary the contact pressure therebetween whereby said movable contact will break contact with said fixed contact under the action of centrifugal force thereon according to the adjusted position of said biasing screw for regulating the speed of said rotatable member by open circuiting the winding thereof above a predetermined speed dependent on the position of said biasing screw, said insulating mounting member forming an enclosure for said speed responsive means with an aperture over said adjusting screw substantially the size of said screw and providing access thereto for adjusting said screw, and said stationary member having a housing totally enclosing said rotor with an aperture for said rotor shaft and a second aperture with which said speed responsive enclosing means screw adjusting aperture is registrable providing access thereto for adjustment of said screw.

5. A dynamoelectric machine comprising a stationary member and a rotatable member having a shaft, said rotatable member having a winding and a current collector connected thereto, means responsive to the speed of said rotatable member for opening and closing the circuit of said rotatable member winding, said speed responsive means comprising an insulating mounting member supported on said rotatable member and arranged around end turns of said rotatable member winding adjacent to said current collector, a fixed electrical contact connected in said rotatable member winding circuit and fixedly mounted on said mounting member, a centrifugally speed responsive movable electrical contact connected in said rotatable member winding circuit and adapted to contact said fixed contact for closing the rotatable member winding circuit therethrough, a relatively flat long leaf-spring reed mounting member having a transverse knee bend dividing the length thereof into two angularly extending leg sections, said movable electrical contact being mounted on one of said leg sections, a lug with two angularly extending sides formed on said insulating mounting member, means securing the other of said leg sections to one of said angularly extending sides of said insulating mounting member lug and arranged with said one leg section extending generally in the same direction as the other of said angularly extending lug sides for supporting said movable electrical contact adjacent to said fixed contact, means comprising an adjusting screw threadedly engaging said insulating mounting member lug and arranged for adjustment therein relative to said reed mounting member one leg section for engagement therewith for biasing said one leg section toward said fixed contact to vary the contact pressure between said movable and fixed electrical contacts whereby said movable contact will break contact with said fixed contact under the action of centrifugal force thereon according to the adjusted position of said biasing screw for regulating the speed of said rotatable member by open circuiting the winding thereof above a predetermined speed dependent on the position of said biasing screw, said insulating mounting member forming an enclosure for said speed responsive means with an aperture over said adjusting screw substantially the size of said screw and providing access thereto for adjusting said screw, and said stationary member having a housing totally enclosing said rotor with an aperture for said rotor shaft and a second aperture with which said speed responsive enclosing means screw adjusting aperture is registrable providing access thereto for adjustment of said screw.

6. A dynamoelectric machine comprising a stationary member and a rotatable member having a shaft, said rotatable member having a core of magnetic material with a winding therein and a current collector connected thereto, means responsive to the speed of said rotatable member for opening and closing the circuit of said rotatable member winding, said speed responsive means comprising an insulating mounting member supported on said rotatable member and arranged around end turns of said rotatable member winding between said current collector and said rotatable member core, a fixed electrical contact connected in said rotatable member winding circuit and fixedly mounted on said mounting member, a centrifugally speed responsive movable electrical contact connected in said rotatable member winding circuit and adapted to contact said fixed contact for closing the rotatable member winding circuit therethrough, a leaf-spring reed mounting member having a transverse knee bend dividing the length thereof into two angularly extending leg sections, said movable electrical contact being mounted on one of said leg sections, a lug on said insulating mounting member, means rigidly securing the other of said leg sections to said insulating mounting member lug and arranged to support said movable electrical contact adjacent to said fixed contact, means comprising an adjusting screw threadedly engaging said insulating mounting member lug and arranged for adjustment therein relative to said reed mounting member one leg section for engagement therewith for biasing said one leg section toward said fixed contact to vary the contact pressure between said movable and fixed electrical contacts whereby said movable contact on said reed mounting member will break contact with said fixed contact under the action of centrifugal force thereon according to the adjusted position of said biasing screw for regulating the speed of said rotatable member by open circuiting the winding thereof above a predetermined speed, said insulating mounting member forming an enclosure for said speed responsive means with an aperture over said adjusting screw providing access thereto for adjusting said screw, said stationary member having a housing totally enclosing said rotatable member with an aperture for said rotor shaft and a second aperture with which said speed responsive enclosing means screw adjusting aperture is registerable providing access thereto for adjustment of said screw, balancing means including a pair of axially extending cups formed integrally with said mounting member on the side of said shaft generally opposite said contacts, one of said cups being larger than the other, and balancing ball means in said cups of such size as to fit in tight retaining engagement within said cups, said ball means having such specific gravity relative to the size thereof as to provide a substantially balanced rotatable member structure.

7. A dynamoelectric machine comprising a stationary member and a rotatable member having a shaft, said rotatable member having a winding and a current collector connected thereto, means responsive to the speed of said rotatable member for opening and closing the circuit of said rotatable member winding, said speed responsive means comprising an insulating mounting member supported on said rotatable member and arranged around end turns of said rotatable member winding between said current collector and said rotatable member core, a fixed electrical contact connected in said rotatable member winding circuit and fixedly mounted on said mounting member, a centrifugally speed responsive movable electrical contact connected in said rotatable member winding circuit and adapted to contact said fixed contact for closing the rotatable member winding circuit therethrough, a leaf-spring reed mounting member having a transverse knee bend dividing the length thereof into two angularly extending leg sections, said movable electrical contact being mounted on one of said leg sections, a lug with two angularly extending sides formed on said insulating mounting member, means securing the other of said leg sections to one of said angularly extending sides of said insulating mounting member lug and arranged with said one leg section extending generally in the same direction as the other of said angularly extending lug sides for supporting said movable electrical contact adjacent to said fixed contact, means comprising an adjusting screw threadedly engaging said insulating mounting member lug and arranged for adjustment therein relative to said reed mounting member one leg section for engagement therewith for biasing said movable contact toward said fixed contact to vary the contact pressure therebetween whereby said movable contact will break contact with said fixed contact under the action of centrifugal force thereon according to the adjusted position of said biasing screw for regulating the speed of said rotatable member by open circuiting the winding thereof above a predetermined speed, said insulating mounting member forming an enclosure for said speed responsive means, balancing means including a pair of axially extending cups formed integrally with said mounting member on the side of said shaft generally opposite said contacts, one of said cups being larger than the other, and balancing ball means in said cups of such size as to fit in tight retaining engagement within said cups, said ball means having such specific gravity relative to the size thereof as to provide a substantially balanced rotatable member structure, the specific gravity of the ball means in one of said cups being different from that in the other cup.

8. A speed responsive governor for a dynamoelectric machine rotatable member comprising an insulating mounting member adapted to be supported on said rotatable member, a fixed electrical contact for connection in the circuit of said rotatable member and fixedly mounted on said insulating mounting member, a centrifugally speed responsive movable electrical contact for connection in the circuit of said rotatable member and adapted to contact said fixed contact for closing the rotatable member circuit therethrough, a reed mounting member having two angularly extending legs, a lug on said insulating mounting member having two angularly extending sides, means securing one leg of said reed mounting member to one of said sides of said lug for supporting said movable electrical contact adjacent to said fixed contact with the other leg of said reed mounting member extending generally in the same direction as said other angularly extending side of said lug, and means comprising an adjusting screw threadedly engaging said lug and extending through the other of said angularly extending sides of said lug into contact engagement with said other leg of said reed mounting member and arranged for adjustment in said lug for biasing said movable contact toward said fixed contact to vary the contact pressure therebetween whereby said movable contact will break contact with said fixed contact under the action of centrifugal force thereon according to the adjusted position of said biasing screw for regulating the speed of said rotor by opening the circuit thereof above a predetermined speed dependent on the position of said biasing screw.

9. A speed responsive governor for a dynamoelectric machine rotatable member comprising an insulating mounting member adapted to be supported on said rotatable member, a fixed electrical contact for connection in the circuit of said rotatable member and fixedly mounted on said insulating mounting member, a centrifugally speed responsive movable electrical contact for connection in the circuit of said rotatable member and adapted to contact said fixed contact for closing the rotatable member circuit therethrough, a reed mounting member having a transverse knee bend dividing the length thereof into two angularly extending leg sections, said movable electrical contact being mounted on one of said leg sections, a lug with two angularly extending sides formed on said insulating mounting member, means securing the other of said leg sections to one of said angularly extending sides of said lug and arranged with said one leg section extending generally in the same direction as the other of said angularly extending lug sides for supporting said movable electrical contact adjacent to said fixed contact, means comprising an adjusting screw threadedly engaging said lug and arranged for adjustment therein relative to said reed mounting member one leg section for engagement therewith for biasing said one leg section toward said fixed contact to vary the contact pressure between said movable and fixed electrical contacts whereby said movable contact will break contact with said fixed contact under the action of centrifugal force thereon according to the adjusted position of said biasing screw for regulating the speed of said rotatable member by opening the circuit thereof above a predetermined speed dependent on the position of said biasing screw, and said insulating mounting member forming an enclosure for said speed responsive means with an aperture over said adjusting screw substantially the size of said screw and providing access thereto for adjusting said screw.

10. A speed responsive governor for a dynamoelectric machine rotatable member comprising an insulating mounting member adapted to be supported on said rotatable member, a fixed electrical contact for connection in the circuit of said rotatable member and fixedly mounted on said insulating mounting member, a centrifugally speed responsive movable electrical contact for connection in the circuit of said rotatable member and adapted to contact said fixed contact for closing the rotatable member circuit therethrough, a reed mounting member having a transverse knee bend dividing the length thereof into two angularly extending leg sections, said movable electrical contact being mounted on one of said leg sections, a lug with two angularly extending sides formed on said insulating mounting member, means securing the other of said leg sections to one of said angularly extending sides of said lug and arranged with said one leg section extending generally in the same direction as the other of said angularly extending lug sides for supporting said movable electrical contact adjacent to said fixed contact, means comprising an adjusting screw threadedly engaging said lug and arranged for adjustment therein relative to said reed mounting member one leg section for engagement therewith for biasing said one leg section toward sadi fixed contact to vary the contact pressure between said movable and fixed electrical contacts whereby said movable contact will break contact with said fixed contact under the action of centrifugal force thereon according to the adjusted position of said biasing screw for regulating the speed of said rotatable member by opening the circuit thereof above a predetermined speed dependent on the position of said biasing screw, said insulating mounting member forming an enclosure for said speed responsive governor with an aperture over said adjusting screw substantially the size of said screw and providing access thereto for adjusting said screw, balancing means including a pair of axially extending cups formed integrally with said insulating mounting member on the side thereof generally opposite said contacts, one of said cups being larger than the other, and balancing ball means in at least one of said cups of a size to fit in tight retaining engagement therein, said ball means having such specific gravity relative to the size thereof as to provide a substantially balanced structure.

References Cited in the file of this patent

UNITED STATES PATENTS

| 1,767,146 | Lee | June 24, 1930 |
| 2,894,192 | Sherwood | July 7, 1959 |
| 2,936,412 | Jin | May 10, 1960 |